(12) United States Patent
Kössl

(10) Patent No.: US 6,814,559 B2
(45) Date of Patent: Nov. 9, 2004

(54) SHAPING APPARATUS FOR AN EXTRUSION SYSTEM

(75) Inventor: Reinhold Kössl, Wartberg/Krems (AT)

(73) Assignee: Greiner Extrusionstechnik GmbH, Kremsmünster (AT)

( * ) Notice: Subject to any disclaimer, the term of this patent is extended or adjusted under 35 U.S.C. 154(b) by 224 days.

(21) Appl. No.: 10/174,708

(22) Filed: Jun. 19, 2002

(65) Prior Publication Data

US 2003/0012834 A1 Jan. 16, 2003

(30) Foreign Application Priority Data

Jun. 26, 2001 (AT) ........................................ A 978/2001

(51) Int. Cl.⁷ .............................................. B29C 47/12
(52) U.S. Cl. ................ 425/190; 425/192 R; 425/326.1; 425/388
(58) Field of Search ............................ 425/190, 192 R, 425/326.1, 388

(56) References Cited

U.S. PATENT DOCUMENTS

| 4,181,487 A | 1/1980 | Kessler |
| 6,682,330 B2 * | 1/2004 | Kossl ..................... 425/192 R |

FOREIGN PATENT DOCUMENTS

| DE | 2239747 | * 8/1972 |
| DE | 2 239 746 | 2/1974 |
| DE | 2 811 450 | 10/1978 |
| DE | 29716343 U1 | 1/1998 |
| DE | 197 45 843 | 4/1998 |
| DE | 298 11 315 | 11/1998 |
| DE | 19917 837 A1 | 10/1999 |

OTHER PUBLICATIONS

Extrusionswerkzeuge für Kunststoffe und Kautschuk, by Walter Michaeli, published in 1991 by Carl Hanser Verlag, pp. 321 to 329.

* cited by examiner

Primary Examiner—Tim Heitbrink
(74) Attorney, Agent, or Firm—Collard & Roe, P.C.

(57) ABSTRACT

The invention relates to a shaping apparatus for an extrusion system with at least one calibration die having a plurality of calibration units (31) disposed one after the other, having a calibration orifice (38) with a plurality of shaping surfaces (39 to 42) which come into contact with an article (6) fed therethrough, and end faces (43) spaced apart from one another with side faces (45 to 48) extending between them. At least one cavity is provided between at least two immediately adjacent calibration units (31). The calibration die is provided with means for dispersing heat. The calibration orifice (38) is provided with at least one continuous circulation passage (67) around a predominant part of and immediately adjacent to its circumference, having a separate inlet and outlet line (68, 69). The circulation passage (67) extends across a predominant distance of a thickness between the end faces (43) of the calibration unit (31), the circulation passage (67) being closed in the region of the two end faces (43).

39 Claims, 7 Drawing Sheets

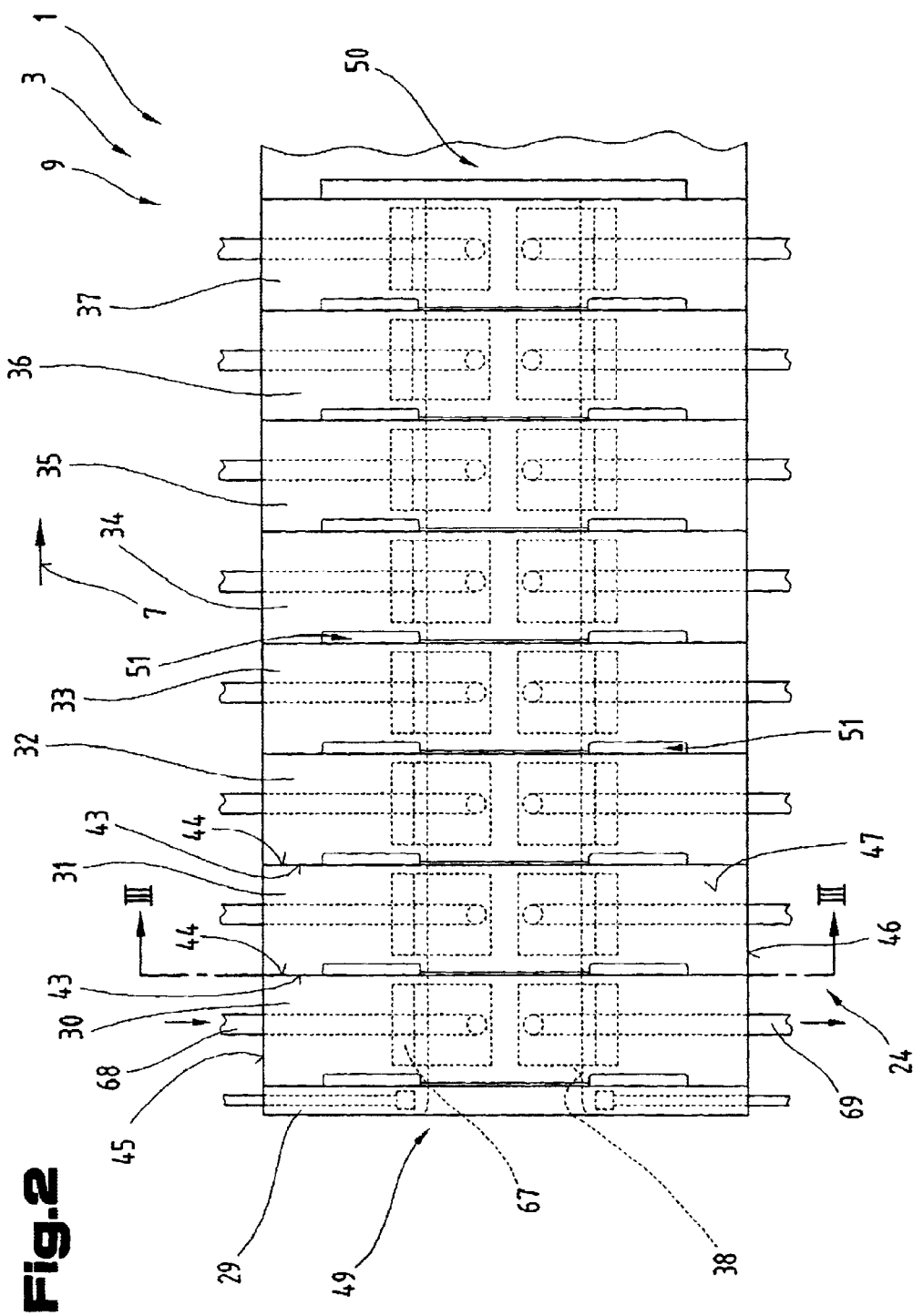

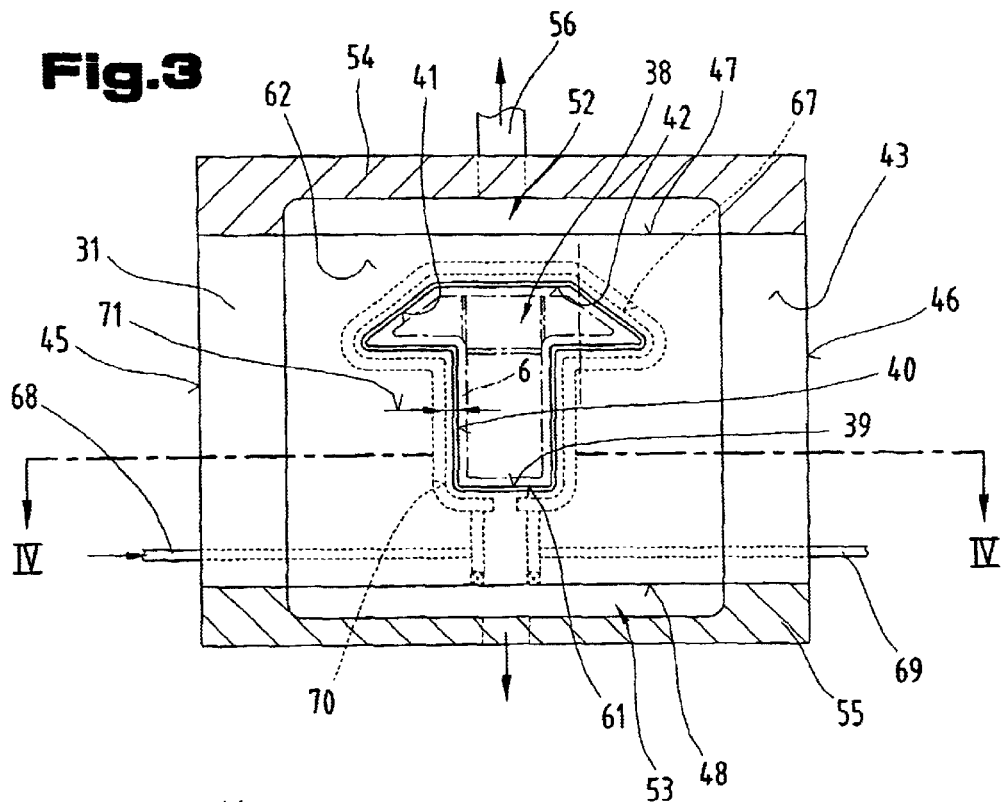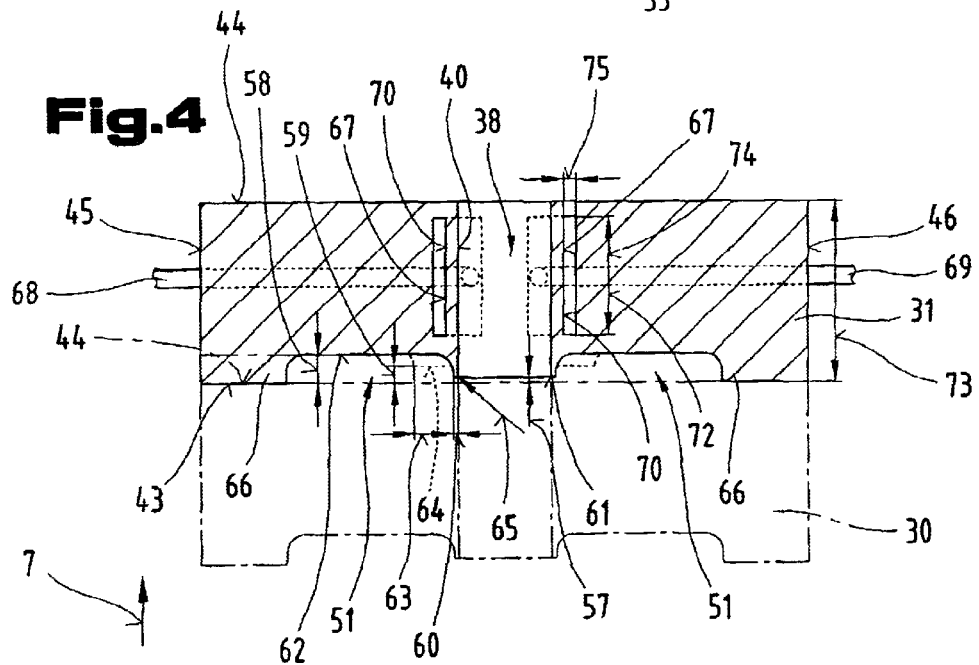

SHAPING APPARATUS FOR AN EXTRUSION SYSTEM

BACKGROUND OF THE INVENTION

1. Field of the Invention

The invention relates to a shaping apparatus for an extrusion system.

2. The Prior Art

A shaping device for an extrusion system is known from patent specification U.S. Pat. No. 4,181,487 A, which comprises at least one calibration apparatus with several plate-type sizing units arranged one after the other in the direction of extrusion. The individual sizing units arranged one after the other having a sizing orifice with several sizing surfaces to which the article being drawn through conforms in an engaging arrangement. These individual sizing units have end faces running in a direction more or less vertically and perpendicular to the sizing surfaces and channels are provided, recessed back from the sizing surfaces, in at least one of the end faces, which extend via a distribution channel to an accumulator channel. When the sizing units are placed side by side, these channels form a plurality of cavities, by means of which a pressure differential can be generated at various points of the article as it is fed through. These individual sizing units are made up of a plurality of hollow jacket-type components, through which a cooling medium flows so that the heat absorbed by the sizing units from the article is fed from the sizing units via the region of their outer side faces. The disadvantage of this design of sizing units is that it is not always possible for the article to be satisfactorily calibrated in every type of application.

Other shaping devices for extrusion systems are known from patent specifications DE 199 17 837 A1 and DE 297 16 343 U1 filed by the same applicant, and consist of at least one calibration device comprising in particular a plurality of calibration dies disposed one after the other in the direction of extrusion, this calibration device and/or the calibration dies being provided with cooling ducts through which a coolant is circulated. The calibration device also has shaping surfaces to which an article conforms as it is fed through, a sealing device being provided at least between the extrusion tool of the shaping apparatus, such as a nozzle for example, and the first calibration die immediately following it in the extrusion direction, to form a cavity which seals off the outer surface of the article from the ambient pressure as it is fed through. However, this sealing arrangement for forming an additional cavity may also be arranged between the first calibration die and at least one other calibration die. These calibration dies are designed in a block construction and it is not always possible for the article to be satisfactorily calibrated in every type of application using this design.

Shaping apparatus is also known in which the plastic lengths of sections, in particular hollow sections or tubes, are calibrated to the desired external and internal dimensions as they leave an extrusion nozzle and are frozen to the desired external dimensions or cooled to the requisite temperature to produce the desired rigidity. Shaping systems of this type are described in the book, "Extrusionswerkzeuge für Kunststoffe und Kautschuk" by Walter Michaeli, published in 1991 by Carl Hanser Verlag, Munich/Vienna, 2nd completely revised and extended version, in particular pages 321 to 329. Page 323 provides an illustration of an external vacuum calibration system, whereby the extruded material leaving the extrusion die in the form of a hollow section is fed into a calibration die at a distance from the point at which it leaves the nozzle lip of the extrusion apparatus, through which extruded material is fed so that the region of its peripheral external surface conforms to the shaping surfaces of the calibration die. The surface of the extruded material is able to engage on the individual shaping surfaces of the calibration die without any clearance due to air inlets, in particular slots, in the shaping surfaces, which communicate via supply lines with a vacuum source. In order to cool the extruded material, the calibration dies are provided with one or more peripheral passages for a cooling medium and the vacuum can be increased in the individual air inlets or slits the farther away they are in distance from the nozzle lip of the extrusion apparatus. The temperature of the cooling medium is very low compared with the mass temperature of the extruded section and is approximately 20° C. In so-called dry calibrators of this type, it is common practice to provide one or more cooling baths, in which the sufficiently rigid sections are cooled to ambient temperature, partly by applying a vacuum and wetting using spray nozzles or by passing them through water baths. With calibration apparatus of this type, it is not possible to obtain a sufficiently high surface quality on the finished extruded material in many cases once the shaping device has been in service for any length of time.

SUMMARY OF THE INVENTION

The underlying objective of the present invention is to propose a shaping apparatus, in particular a calibration system, by means of which the article being fed through is uniformly and rapidly cooled by virtually the entire circumference of the calibration orifice.

This objective is achieved by the invention with a shaping apparatus for an extrusion system with at least one calibration device comprising means for dispersing heat and at least one calibration die with several calibration units disposed one after another in an extrusion direction. Each calibration unit has at least one calibration orifice with several shaping surfaces which come into contact with an article fed therethrough, end faces spaced apart from each other in the extrusion direction, and side faces extending between the end faces, a first end face being directed towards an inlet region and a second end face being directed towards an outlet region of the article fed through the calibration orifice. At least one cavity is formed between two immediately adjacent calibration units, the cavity extending from a respective one of the shaping surfaces to, and opening into, a passage. The calibration orifice is provided with at least one continuous circulation passage around a predominant part of, and immediately adjacent to, the circumference thereof, the circulation passage having a separate inlet and outline line, extending across a predominant distance of a thickness between the two end faces of the calibration unit and being closed in the region of the end faces, the circulation passage is provided with at least one transverse passage along the circumferential extension thereof extending across a predominant distance of the thickness between the end two faces, the transverse passage being closed at the region of the two end faces and having a flow connection to the circulation passage via at least one connecting passage, and a baffle system projects from the connecting passage in a direction opposite the calibration orifice, at least in certain regions, into the flow cross-section of the circulation passage.

The surprising advantage of this solution resides in the fact that every calibrating unit or units is provided with a separate circulation passage in the region of the calibration orifice, which runs inside the calibration unit without any connection to a delimiting external face thereof other than the inlet and outlet lines. Consequently, virtually the entire circumference of the calibration orifice can be cooled by the coolant fed through the circulation passage. It can be arranged immediately along and adjacent to the shaping surfaces, and the cavities provided between the end faces of immediately adjacent calibrating units can be designed so as to run around almost all or all of the circumference of the calibration orifice. Furthermore, heat is fed away from virtually the entire thickness of the calibration unit in the region of the shaping surfaces because the circulation passage can be disposed right in the region of the two end faces spaced at a distance apart from one another. Also, in areas of the profiled section which are difficult to cool and calibrate, particularly areas where there are groove-shaped recesses, a sufficient quantity of heat can be dispersed from the article in these regions, whilst the closed passage arrangement inside the individual calibration units is preserved. A large amount of heat can also be easily removed from these profiled areas by branching a part-flow off from the main flow of the circulation passage. Furthermore. the partial amount of part-flow diverted from the main flow of the circulation passage and circulated through the transverse passage can be specifically selected to produce a specific cooling result and hence a specific instant which this profiled section solidifies.

If each calibration unit has at least one separate circulation passage, heat is dispersed from the article to the circulating medium uniformly across the entire length of the calibrating device, thereby ensuring that the article is cooled rapidly. The fact that several of the calibrating units are each provided with at least one circulation passage means that it is possible to apply coolant to each of the calibration units separately, enabling heat to be fed away rapidly. Sufficient cooling medium is delivered to each of the calibrating units arranged immediately one after the other to absorb the heat, which means that a large amount of heat can be dispersed from the article.

Preferably, the calibration orifice in each calibration unit has several circulation passages separated from one another, each having separate inlet and outlet lines. Because several separate circulation passages are provided, a higher quantity of cooling medium at a lower temperature can be fed around and along the circumference of the calibration orifice to absorb the heat so that the heat can be carried away even more rapidly.

When the outlet line from a first calibration unit is connected to the inlet line, the circulation passages of several calibration units disposed immediately one after the other can be placed in flow connection with one another to provide a circulation through these passages, so that several calibration units can be equipped to allow the cooling medium to flow in an immediately consecutive arrangement in a simple and uncomplicated manner. This means that a counter-flow circulation can be set up within the individual circulation passages between the calibration units arranged immediately one after the other.

The connection between the outlet line and the inlet line of immediately adjacent calibration units may be disposed externally of the cavity therebetween. In this case, the circulation passages arranged immediately adjacent to one another allow heat to be fed away rapidly from the region of the shaping surfaces on the one hand, and, on the other, the cavity provided around the calibration orifice can be without any connecting line so as to be free for the purpose of applying a vacuum pressure to the external surfaces of the article to be calibrated. This enables a vacuum pressure to be built up unhindered across virtually the entire cross section and external surface of the article.

If the inlet line is connected to the circulation passages by a common distribution passage extending continuously through several calibration units and dispersed externally to the cavity therebetween, the coolant can be distributed to the circulation passages in a simple manner via the common distribution passage arranged upstream of and between them. A vacuum can also be generated unhindered on the external surface of the article across its entire cross section in the region of the cavity.

If several circulation ,passages are connected to the outlet line via a common collection passage extending continuously through the calibration units externally to the cavity therebetween, the individual circulation passages are linked by a common collection passage and the discharge line also provides a simplified means for discharging the coolant fed through the calibration units. Another advantage is that by providing the calibration units with end faces of a planar, design, there is no need to provide sealing elements and the cooling medium can be fed from the circulation passages as far as the collection passage and through it between the individual calibration units in a simple manner.

A uniform flow of the coolant inside the circulation passage is produced if the circulation passage has substantially the same flow cross section and passage dimensions around its circumferential extension around the calibration orifice.

Heat is carried away from the article by the cooling medium uniformly and rapidly if a delimiting surface of the circulation passage facing the calibration orifice runs at a substantially same distance from the associated shaping surface of the calibration orifice.

If a first part of the baffle system is designed as an inlet system from the circulation passage into the transverse passage and second part of the baffle system as an outlet system from the transverse passage to the circulation passage, coolant can be selectively fed into and discharged out from the transverse passage from the main flow in the circulation passage.

A part of the main flow can be diverted past the baffle system unhindered so that a specific quantity of the diverted part-flow can be delivered to the transverse passage if a length of the inlet system plus a length of the outlet system in the direction of the thickness of the calibration unit is shorter than the entire depth of the passage dimension of the circulation passage in the same direction.

Preferably, the length of the inlet system plus the length of the outlet system in the direction of the thickness of the calibration unit is the same as the full depth of the passage dimension of the circulation passage in the same direction. In this case, the part-flow from the main flow of the circulation passage can be delivered to and discharged from the entire depth or width of the circulation passage in a specific amount, providing a simple means of obtaining the desired cooling effect and the related dispersion of heat in the region of the transverse passage.

If the inlet system and the outlet system are disposed in the circulation passage respectively adjacent to one of the two end faces, a longitudinal and transverse flow is produced inside the circulation passage between the two end faces spaced at distance apart from one another, thereby avoiding dead spaces inside the individual flow passages and guaranteeing a high dispersion of heat.

Arranging the cavity or several cavities around the entire circumference of the calibration orifice, right up to the shaping surfaces delimiting the calibration orifice, enables a uniformly homogeneous vacuum to be produced across almost the entire periphery of the section. Another advantage is the fact a pressure below atmospheric pressure can now be applied to profiled sections that are difficult to calibrate, which means that perfect calibration results can also be achieved in these regions. Similarly, this uniform pressure differential between cavities in the hollow section and the external surfaces of the article allows the external surfaces of the article to be made to lie so that they almost completely conform to the shaping surfaces, improving the dimensional stability of the article to be produced. The design of the circumferential cavity around almost the entire circumference of the calibration orifice makes manufacture less complicated than the system employed for a block structure arrangement where vacuum slits, and the bores needed to apply a vacuum pressure to the vacuum slits, have to be provided in the calibration blocks.

Preferably, the cavity has a differing width starting from the shaping surfaces in the direction parallel with the shaping surfaces and the width increases the greater the distance from the shaping surface is. Thus is of advantage because the volume of the cavity increases the farther it is away from the shaping surfaces, affording a larger cross section for the intake of air and the process of building up a vacuum pressure, which also means that longer intake paths are provided to compensate for pressure losses, in turn enabling an almost homogeneous vacuum to be generated in the region of the external surface of the article.

Specifically claimed dimensions of the cavity enable a specific flow cross section to be set depending on the selected width of the cavity and, in the immediate transition region between facing end faces of calibration units disposed immediately one after the other, the dimension of the cavity or gap between the end faces can be selected to suit requirements, on the one hand enabling flow losses to be compensated and, on the other, preventing too high suction at surface areas of the article in the region of the vacuum slit.

The width of the cavity may differ around the circumference of the calibration orifice in the region of the first partial end face. This enables the pressure differential between the cavities of the article and its external surface to be set.

The may be fed more efficiently and unhampered into the individual calibration units if a radius in a transition region between the shaping surfaces and the immediately adjacent first partial end faces of the calibration units is between 0.1 mm and 1.0 mm.

Other claimed embodiments of the shaping apparatus bring a considerable reduction to the cost of manufacturing the individual calibration units, because the individual cavities can be made simply by processing the end faces, for example. This significantly improves accessibility, enabling the gap widths in the cross-over region between the individual calibration units to be better adjusted. This also offers a simple and uncomplicated means of evacuating the individual cavities by connecting them to the co-operating vacuum passages.

Finally, the calibration unit is preferably between 6.0 mm and 60.0 mm thick in the direction perpendicular to the end faces, which allows the number of cavities distributed around the calibration orifice to be fixed and varied on the one hand, and, on the other, reduces the processing needed to make the circulation passages.

BRIEF DESCRIPTION OF THE DRAWINGS

The invention will now be described in more detail with reference to embodiments illustrated in the drawings, wherein:

FIG. 2 is a simplified, schematic diagram showing a plan view of a part-region of the shaping apparatus illustrated in FIG. 1;

FIG. 3 is a view of a calibrating unit of the shaping apparatus, viewed in section along the line III—III of FIG. 2;

FIG. 4 is a plan view of the calibration unit, seen in section along the line IV—IV indicated in FIG. 3;

DETAILED DESCRIPTION OF PREFERRED EMBODIMENTS

Figure 1:
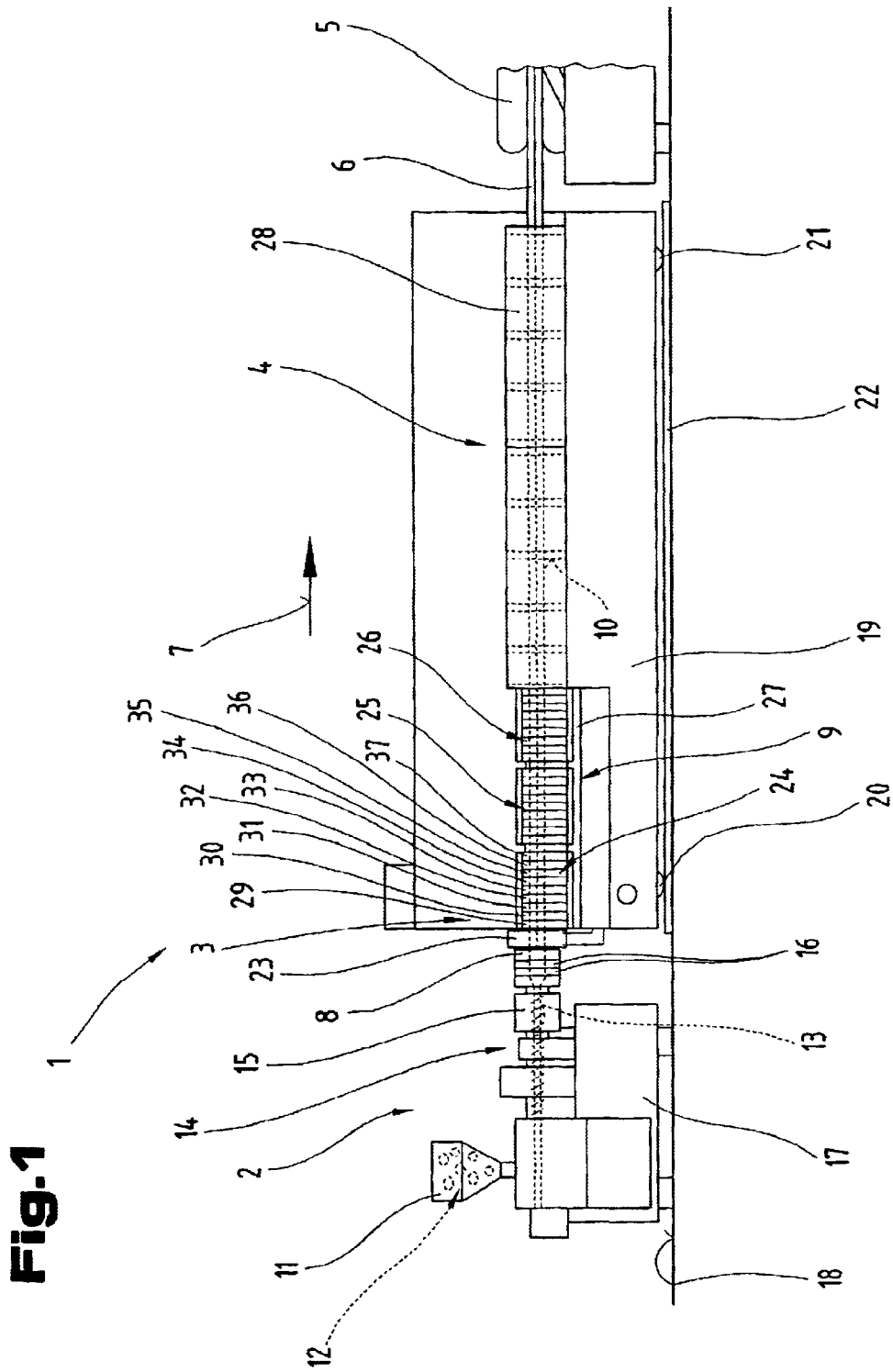
FIG. 1 is a simplified, schematic diagram of an extrusion system with shaping apparatus as proposed by the invention, seen in a side view.

Firstly, it should be pointed out that the same parts described in the different embodiments are denoted by the same reference numbers and the same component names and the disclosures made throughout the description can be transposed in terms of meaning to same parts bearing the same reference numbers or same component names. Furthermore, the positions chosen for the purposes of the description, such as top, bottom, side, etc, relate to the drawing specifically being described and can be transposed in terms of meaning to a new position when another position is being described. Individual features or combinations of features from the different embodiments illustrated and described may also be construed as independent inventive solutions or solutions proposed by the invention in their own right.

FIG. 1 illustrates an extrusion system 1, consisting of an extruder 2, a shaping apparatus 3 arranged downstream thereof, a cooling system 4 arranged downstream of it, which may optionally also constitute a calibration system, and a crawler off-take 5 for an extruded article 6. The purpose of the crawler off-take 5 is to carry the article 6, which might be a section, in particular a hollow section with some profiled areas incorporating a cavity in the interior of the section and some areas made of solid material, made of plastics for building windows, in the extrusion direction 7—as indicated by the arrow—out from the extruder 2 into the shaping apparatus 3 and cooling system 4, after which it is cut into appropriate lengths by means of apparatus not illustrated in detail, such as saws, for example. In the embodiment illustrated as an example here, the shaping apparatus 3 consists of an extrusion nozzle comprising an extrusion die 8, a calibrating device 9 and support plates 10 in the cooling system 4. In addition to the support function, the support plates 10 may also be designed as calibrating plates for the article 6.

Located in the region of the extruder 2 is a container 11, from which a material 12, such as a mixture or granulate for forming a plastics material, in particular heat-deformable materials such as PVC, ABS, PP, PE, for example, and/or bi-polymers containing proportions of fibre from natural materials, synthetic materials, glass, carbons, aramide and similar, is fed by means of at least one but preferably several screw conveyors 13 in the extruder 2 to the extrusion die 8. The extruder 2 additionally has a plasticizing unit 14, by means of which, and by means of optionally provided heating devices 15, the material 12 is heated and plasticized as the material 12 is fed through it by the screw conveyors 13 depending on its intrinsic properties, subjected to pressure and, optionally, additionally applied heat. Before entering the extrusion die 8, the mass flow of plasticized material 12 is fed to transition zones 16 until the section assumes the desired cross section.

The extrusion die 8 is supported or retained along with the plasticizing unit 15 and the container 11 on a machine bed 17, the machine bed 17 being placed on a flat standing surface 18 such as a flat factory floor.

Along with the downstream cooling system 4, the calibrating device 9 is disposed or retained on a calibrating table 19, the calibrating table 19 being supported by means of rollers 20, 21 on one or more tracks 22 secured to the standing surface 18. The purpose of mounting the calibrating table 19 on the tracks 22 by means of rollers 20, 21 is to allow the entire calibrating table 19 to be moved, together with the mechanisms and devices arranged on it, in the extrusion direction 7—as indicated by the arrow—from and to the extrusion die 8. In order to make this displacement easier and more accurate, the calibrating table 19 and one of the rollers 20, 21, is provided with a drive, not illustrated in detail, which enables a selective and controlled longitudinal displacement of the calibrating table 19 towards the extruder 2 or away from the extruder 2. Any solutions and units known from the prior art may be used for the drive itself and to control this driving motion.

The calibrating device 9 is made up of several schematically illustrated calibration dies 23 to 26 arranged one after the other in the extrusion direction 7—indicated by the arrow—supported on a mounting plate 27, and may be designed to operate the calibration process under vacuum, the extruded article 6 being calibrated within the individual shaping and or calibration dies 23 to 26.

The calibration process may be a combination of wet and dry calibration, for example, or may be operated as a totally dry calibration process. Furthermore, steps may also be taken to prevent penetration of any ambient air at least between the extrusion die 8 and the first calibration die 23 and/or at least between the first calibration die 23 and other calibration dies 24 to 26. Clearly, however, it would also be possible to allow the ingress of ambient air to the article 6, at least in certain regions between the individual calibration dies 23 to 26 or to provide water baths.

The cooling system 4 for the article 6 as it leaves the calibration device 9 comprises at least one cooling chamber 28, provided in the form of a schematically illustrated housing, divided into regions disposed immediately one after the other by means of schematically illustrated support plates 10 in the interior of the cooling chamber 28. Another option, however, would be to reduce the pressure in the interior of the cooling chamber 28 or individual sections between the support plates 10 to a level below atmospheric pressure.

On leaving the extrusion die 8, the article 6 is of a shape in cross section which is determined by the latter, and is sufficiently calibrated and/or cooled in the adjoining calibration dies 23 to 26 forming the calibration device 9, so that the surface and peripheral regions of the viscid, plastic article 6 are cooled to the degree that its external shape is stable and duly formed to the requisite dimensions. Adjoining the calibration device 9, the article 6 is passed through the cooling system 4 to impart additional cooling and, optionally, calibration, thereby dispersing any residual heat which might still be present in the article 6.

As may be seen from the simplified diagram, at least one of the calibration dies 24 to 26 is made up of several consecutively arranged calibration units 29 to 37, a more detailed description of the design of the individual calibration dies 24 to 26, in particular the layout and design of the cooling passages for dispersing heat and the individual vacuum chambers, being given below with reference to the drawings.

FIGS. 2 to 4 depict the calibration die 24 of the calibration device 9, the calibration units 29 to 37 of which they are made up being illustrated in a simplified format on a larger scale. The individual calibration units 29 to 37 have at least one calibration orifice 38 with a plurality of schematically indicated shaping surfaces 39 to 42 which are applied against at least one article 6 fed therethrough, indicated in simplified format in FIG. 3 by means of broken lines. The articles 6 drawn through the system are usually sections for building windows, having in particular a section casing enclosing at least one cavity, which is divided into other cavities in different spatial directions by means of several schematically indicated lands.

The individual calibration units 29 to 37 also have parallel end faces 43, 44 perpendicular to the shaping surfaces 39 to 42 and spaced apart from one another in the extrusion direction 7, as well as side faces 45 to 48 extending between them. In the embodiment illustrated as an example here, the two opposing side faces 45, 46 are disposed on either side of the calibration orifice 38 and the other side faces 47 and 48 on the top and bottom of the calibration units 29 to 37. In the case of the extrusion direction selected in the illustrated example, the first end face 43 is directed towards an inlet region 49 and the second or other end face 44 towards an outlet region 50 of the article 6 as it is drawn through.

As may be seen particularly clearly from FIGS. 2 and 4, at least one cavity 51 is formed between at least two immediately adjacent calibration units 29 to 37 or the end faces 44, 43 directed towards one another, and extends from the calibration orifice 38 or shaping surfaces 39 to 42 delimiting it through to a passage 52, 53, into which it opens. Naturally, it would be possible to design only one of the passages 52, 53 so that it co-operates with the cavity 51, in which case the number of passages can be freely selected depending on the degree of vacuum to be generated in the cavity 51. The two passages 52, 53 are preferably recessed into a cover and base plate 54, 55, and, as schematically indicated, at least one of the passages 52, 53 is connected via a connector to a suction line 56 with at least one suction device, in particular a vacuum generator, not illustrated here.

The individual calibration units 29 to 37 of the schematically illustrated calibration die 25 disposed immediately adjacent to one another are designed so that in the region of their end faces 43, 44, the abutting areas of the end faces form a virtually complete seal due to the flat abutment of the surfaces. The same also applies to the abutment surfaces of the cover and base plate 54, 55 in the region where they abut with the side faces 47, 48, also producing a sealing effect here, which is sufficient, in conjunction with the connection between the passage 52, 53 and the suction device, to generate a pressure below atmospheric pressure throughout the entire cavity 51.

As may be seen by comparing FIGS. 3 and 4, the cavity 51 is, or the cavities are, open around the entire circumference of the calibration orifice 38 towards the calibration orifice 38 delimited by the shaping surfaces 39 to 42. As an alternative, the cavity 51 could open into the calibration orifice 38 over only a predominant part of its circumference. This being the case, air at an air pressure below the outside pressure can be applied all over the external surfaces of the article 6 being fed through, in other words those directed towards the shaping surfaces 39 to 42, so that the ambient pressure in the cavities of the article 6 comes into play, enabling a difference in pressure to be obtained between the cavities of the article 6 and the external surface of the article 6. As a result of this pressure differential obtained in at least certain regions around the circumference of the calibration orifice 38, the still plastic article 6 is sucked against the shaping surfaces 39 to 42 so that the external surfaces of the article 6 lie against the shaping surfaces 39 to 42, on the one hand, and, on the other, the article 6 is cooled due to the fact that the heat applied during the extrusion process is carried away—as will be explained in more detail below—thereby imparting to the article 6 the desired shape of cross section.

In the embodiment illustrated as an example here, the cavity 51 has a differing width 57 to 59, starting from the shaping surfaces 39 to 42, as measured in a direction parallel with the shaping surfaces 39 to 42, which becomes larger the greater the distance from the shaping surface 39 to 42.

As may be seen more clearly from FIG. 4, the cavity 51 is of a width 57 of between 0.2 and 3.0 mm, preferably between 0.4 mm and 1.0 mm, between the calibrating units 30 and 31 illustrated here, in the region of the facing end faces 43, 44 across a first distance 60 of 0.3 to 5.0 mm, preferably 0.5 to 2.0 mm, starting from one of the shaping surfaces 39 to 42 in a direction perpendicular thereto, first part-end faces 61 being formed on the calibrating unit 29 to 37 in this region. The cavity 51 is therefore gap-shaped across the length of the first part-end surface 61, i.e. in the direction of the first distance 60, and the first width 57 can be selected to the specified dimensions depending on the profiled shape of the article 6 to be calibrated and on the basis of the pressure differential generated between the cavity 51 and the cavities of the article 6.

Adjoining the first distance 60, the cavity 51 is of a width 58 of between 2.5 mm and 10.0 mm, forming second part-end surfaces 62 on the calibrating unit. However, it may also be of advantage if the width 59 adjoining the first distance 60 of the cavity 51, starting from this first distance 60 and continuing for a further distance 63 of 6.0 mm to 20.0 mm, also in a direction perpendicular to the shaping surfaces 39 to 42, is between 1.0 mm and 2.5 mm, so that additional part-end faces 64 are formed on the calibrating unit 29 to 37, as indicated by broken lines. The specified widths 57 to 59 extend starting from the end face 44 of the respective upstream calibrating unit 29 to 36 as far as the respective part-end faces 61, 62 and 64. This stepped arrangement of the individual part-end surfaces 61, 62 and 64 described above, in particular the number of these part end-surfaces 61, 62 and 64, depends on the section and the vacuum pressure to be generated on the external surfaces of the section and may be freely selected accordingly. It may, therefore, be possible to obtain the requisite sizing with two part-end surfaces, for example.

In the embodiment illustrated as an example here, the part-end faces 61, 62 and 64 are aligned parallel with the end faces 43, 44, but are arranged apart from them by the widths 57 to 59.As a result of the different widths 57 to 59, the volume of the cavity 51 becomes larger the greater the distance 60, 63 or spacing from the calibration orifice 38, which means that flow losses incurred as the vacuum pressure is built up in the cavity 51 can be compensated, even on longer flow paths, as far as the region of the first part-end surfaces 61, thereby enabling an almost uniform vacuum pressure to be generated around the circumference of the calibration orifice 38. Consequently, a uniform pressure differential between the external face and the cavity of the article 6 can be built up across virtually the entire periphery of the article 6 to be cooled.

In order to expose different wall thicknesses of the article 6 to a vacuum pressure, for example, and thus generate the desired pressure differences along the periphery, the width 57 between the first part-end face 61 and the other end face 44 of the calibration unit 30 immediately before it may be of a different design around the circumference of the calibration orifice. This being the case, care must be taken to ensure that the vacuum pressure in the region of the cavity 51 is selected so that the pressure difference generated between the cavities of the article 6 and the cavity 51 is adapted to the required degree of cooling in the article 6.

If the article 6 to be cooled is still relatively soft, i.e. is still viscid and plastic, the selected pressure differential must be lower than in the region in which there has already been a greater degree of cooling in the article and where the external casing forming the article 6 has already reached a sufficient degree of natural stiffness. If the selected pressure differential is too high, a positive connection could result in the region between the first part-end face 61 and the other end face 44 of the immediately preceding calibration unit facing it, which would damage the article 6 to be cooled. This would result in the external surface of the article 6 being sucked into the gap, at least in certain regions, between the first part-end face 61 and the other end face 44, so that a positive engagement would occur in certain regions around the periphery of the article 6. In order to make it easier for the article 6 to pass through the individual calibration units 29 to 37 as it cools, it is of advantage if a radius 65 in the transition region between the shaping surfaces 39 to 42 and the immediately adjacent part-end faces 61 is of a size of between 0.1 mm and 1.0 mm. However, it would also be possible to choose a radius 65 of any other dimension.

In the region of the two oppositely lying side faces 45, 46, which in this example are vertically disposed, the cavity 51 is bounded on the side facing away from the calibration orifice 38 by at least two strip-shaped components 66, as schematically indicated by a broken line in the left-hand region of FIG. 4. However, the strip-shaped components 66 could also be integrally joined to the calibrating units 30 to 37, in which case the individual calibrating units would be of an integral design. This will be the case if the cavity 51 is provided as a recess in one of the end faces 43, 44 of the calibration units 30 to 37. This recess may be made by milling, for example, so that the width 57 to 59 is milled to the corresponding depth to form the cavity 51. In the example illustrated here, in particular the diagram shown in FIG. 3, the cavity 51 opens into at least one passage 52, 53 in the region of the other oppositely lying side faces 47, 48.

In the embodiment illustrated as an example, the part-end faces 61, 62 and 64 are directed towards the inlet region 49 through which the article 6 is fed through the calibration device 9. Naturally, the individual part-end faces 61, 62 and 64 could also be directed towards the other end face 44 remote therefrom—in other words the outlet region 50.

As may be seen from the detailed diagrams given in FIGS. 3 and 4, the calibration orifice 38 is provided over a predominant part of its circumference with an immediately adjacent circulation passage 67 having a respective separate delivery line and discharge line 68, 69. A delimiting surface 70 of the circulation passage 67 facing the calibration orifice 38 runs more or less at a same distance 71 from the associated shaping surface 39 to 42 of the calibration orifice 38. As a result of this uniform distance 71, more or less the same amount of heat is removed, starting from the shaping surfaces 39 to 42, from the article as it fed through and comes into contact with the shaping surfaces.

As may be seen more particularly from FIG. 4, the circulation passage 67 extends for a predominant distance 72 of a thickness 73 of the calibration units 29 to 37 between the respective two end faces 43, 44. The circulation passage 67 is closed respectively in the region of the two adjacent end faces 43, 44, which reliably ensures that the cooling medium, in particular water, not illustrated in detail, fed to the delivery line 68 can not leak out.

It is also of advantage if the circulation passage 67 has more or less the same flow cross section and the same passage dimensions 74, 75 along its circumferential extension around the calibration orifice 38. Accordingly, the passage dimension 74 extends parallel with the shaping surfaces 39 to 42 and spaced at a same distance 72. The passage dimension 75 in this case is selected so as to be perpendicular to the passage dimension 74 and parallel with the end faces 43, 44. These two passage dimensions 74, 75 determine the flow cross section of the circulation passage 67 and this flow cross-section as well as the passage dimensions 74, 75 will be substantially the same around the entire circumference or peripheral extension of the calibration orifice 38.

As also illustrated in FIG. 3, in the region of the shaping surface 39, the circulation passage 67 is not continuous in this region and ingress to the circulation passage is by the inlet line 68 in the left-hand side of FIG. 3 and, as shown in the right-hand half of FIG. 3, the cooling medium can be discharged via the outlet line 69 at the end of the circulation passage 67.

The essential factor is that, for reasons of strength, the distance 72 and the passage dimension 74 towards the thickness 73 does not extend fully along the entire thickness 73, as illustrated in the region of the other end face 44. Likewise, the circulation passage 67 is also arranged at a distance from the part-end face 62 of the cavity 51 illustrated here. Consequently, the selected spacing or distances of the passage walls from the end face 43, respectively 44, respectively the part-end faces 62, 64, is as small as possible so that the passage dimension 74 is disposed almost across the entire thickness 73 of the calibrating units 29 to 37 and hence the shaping surfaces 39 to 42.

In the selected arrangement illustrated here, every one of the individual calibration units 29 to 37 is provided with its own circulation passage 67 with separate inlet and outlet lines 68, 69. For the sake of clarity, individual supply lines for delivering the cooling medium to the inlet line 68 and the corresponding system for removing or reconditioning the heated cooling medium after it has passed through the circulation passage 67 are not illustrated and may naturally be freely selected from any means known from the prior art. Likewise, a connection between the individual calibration units 29 to 37 for conveying the coolant inside the calibration units may be provided, as will be explained in more detail with reference to the next drawing. Another option, however, would be to provide several circulation passages 67 respectively separated from one another along the profiled contour or calibration orifice 38, which will also be explained in more detail with reference to one of the subsequent drawings.

Figure 5:
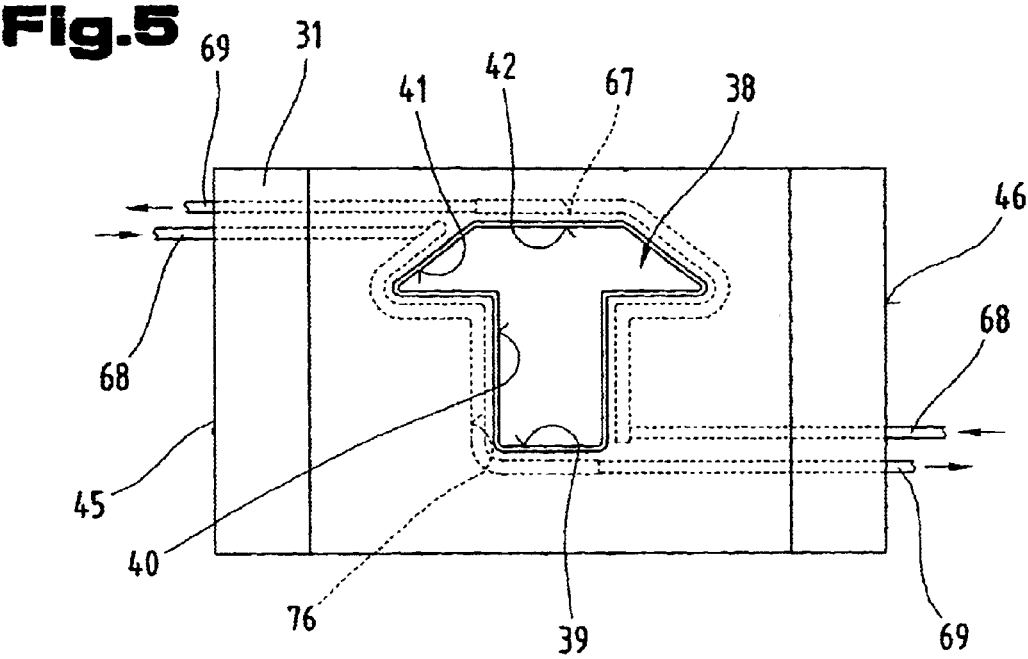
FIG. 5 is a simplified, schematic diagram illustrating another embodiment of the calibration unit with several circulation passages arranged along the calibration orifice.

FIG. 5 illustrates another design of a calibration unit 31, which may be construed as an independent embodiment, the same reference numbers as those used for FIGS. 1 to 4 being used to denote the same parts. To avoid unnecessary repetition, reference should be made to the description given in relation to FIGS. 1 to 4 above.

As mentioned above, the embodiment illustrated as an example here has a separate coolant circuit along the calibration orifice 38, an extra circulation passage 76 being provided in addition to the circulation passage 67. As may be seen from the diagram, the separately arranged circulation passages 67, 76 run around the greater part of the circumference of the immediately adjacent individual shaping surfaces 39 to 42. The circulation passage 67, shown more clearly on the right-hand side of the drawing, is supplied with cooling medium via the inlet line 68 shown at the bottom right-hand side, which flows through the circulation passage 67 and leaves it via outlet line 69 shown in the top left-hand part of calibration unit 31 in the example illustrated. The other circulation passage 76 in this example runs in the bottom left-hand region of the calibration unit 31 and is supplied with coolant via the inlet line 68 in the top-left-hand side, which flows out via the outlet line 69 in the bottom right-hand region close to the inlet line 68 described above.

Naturally, the flow direction of the cooling medium through the circulation passages 67, 76 need not necessarily be the same, in this case in an anti-clockwise direction, and instead may run in opposite circumferential directions relative to the calibration orifice 38. For example, the inlet lines 68 may be arranged in the region of the side face 46 and the outlet lines 69 in the region of the first side face 45. Naturally, it would also be possible to switch the inlet and outlet lines 68, 69 over and they could be provided in the region of the first side face 45 and the other side face 46 instead.

Otherwise, the design of the calibration unit 31, in particular the cavity 51, and the part-end faces 61, 62 and optionally 64 in the region of the first end face 43, may be the same as that described above with reference to FIGS. 2 to 4. The same applies to the layout and design of the circulation passage 67, 76, in particular the passage dimensions 74, 75 and distances 71 between the shaping surfaces 39 to 42 and the delimiting surface 70 immediately adjacent thereto.

Figure 6:
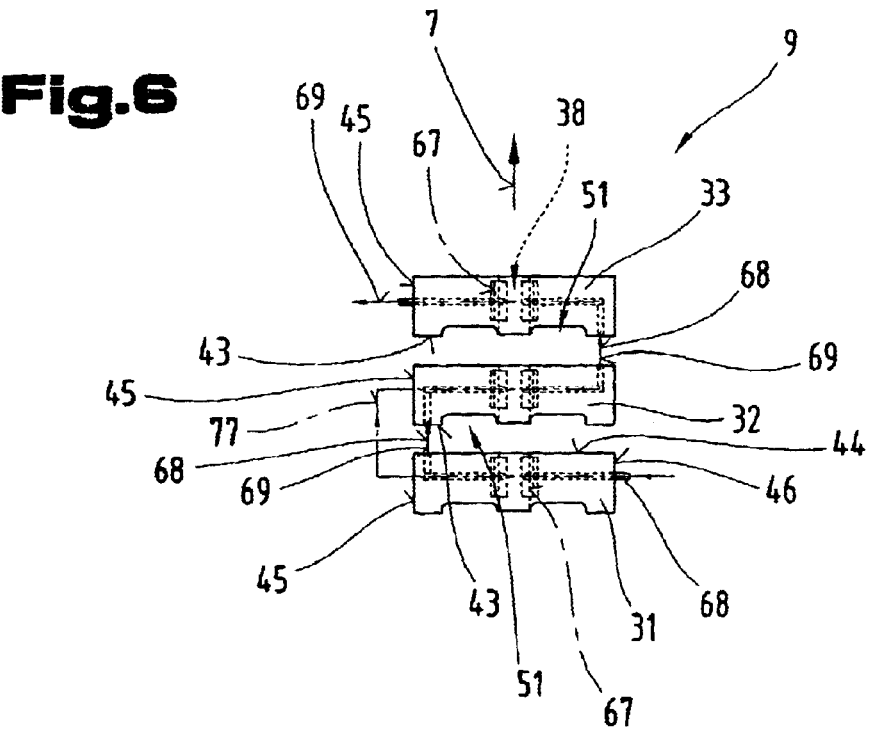
FIG. 6 is a plan view of several calibrating units disposed one after the other but separated from one another, providing a simple illustration of how the inlet and outlet lines connect.

FIG. 6 provides a simplified illustration of several calibration units of the calibration device 9, the calibration units 31 to 33 in this example being shown in plan view and separated from one another in order to show more clearly how the cooling medium is conveyed between the individual calibration units 31 to 33. For the sake of simplicity, the calibration orifice 38 is shown in conjunction with only one circulation passage 67. However, several circulation passages 67, 76 could be provided and connected with one another in the manner that will now be described.

The cooling medium is fed to the first calibration unit 31 in the example illustrated via the schematically indicated inlet line 68 in the region of the side face 46 and through to the circulation passage 67, which runs around a major part of the circumference of the calibration orifice 38, and, adjoining it in the region of the other end face 44, then connects via a schematically indicated outlet line 69 to the inlet line 68 in the region of the first end face 43 of the other calibration unit 32. Cooling medium flows through the latter in the direction opposite that of the upstream calibration unit 31 and is delivered, again in the region of the other end face 44 on the side lying opposite the inlet line 68, via the outlet line 69 to the inlet line 68 of the subsequent calibration unit 33. The circulation passage 67 provided in the calibration unit 33 is the same as the circulation passage 67 provided in the first calibration unit 33 but the cooling medium is discharged in the region of the first side face 45, in other words in the left-hand region of the calibration unit 33, via the outlet line 69.

Consequently, a common coolant is circulated and flows through the individual calibration orifices 38 in the region of the calibration units 31 to 33, being conveyed from one to the next consecutive calibration unit externally to the cavity 51 provided between the calibration units. This can be achieved by providing matching bores, whereby end faces 43, 44 can be ground in a planar arrangement so that these surfaces sit in a reciprocally flat arrangement with one another, obviating the need to provide sealing means between the individual outlet and inlet lines 69, 68 in the region of the calibration units. Under all circumstances, care must be taken to ensure that no coolant is able to get from the region of the connecting line between the individual calibration units 29 to 37 into the cavity 51, since this cavity 51 is provided exclusively as a vacuum slot.

Irrespective of the above, however, another option, illustrated in a simplified format in the left-hand region of the two calibration units 31, 32, is to connect the circulation passages 67 to one another by means of a connecting line 77, illustrated in broken lines, a separate line being provided which is external to the two calibration units 31, 32.

Naturally, the coolant conveyed between the individual calibration units 31 to 33 could also be conveyed via several of these calibration units and this will depend on the amount of heat to be dispersed and the associated absorption of heat by the cooling medium. If a plurality of circulation passages 67, 76 is provided within the individual calibration units 29 to 37, conveyance may be provided in a counter-flow arrangement between the individual calibration units 29 to 37, as described with reference to FIG. 5.

Figure 7:
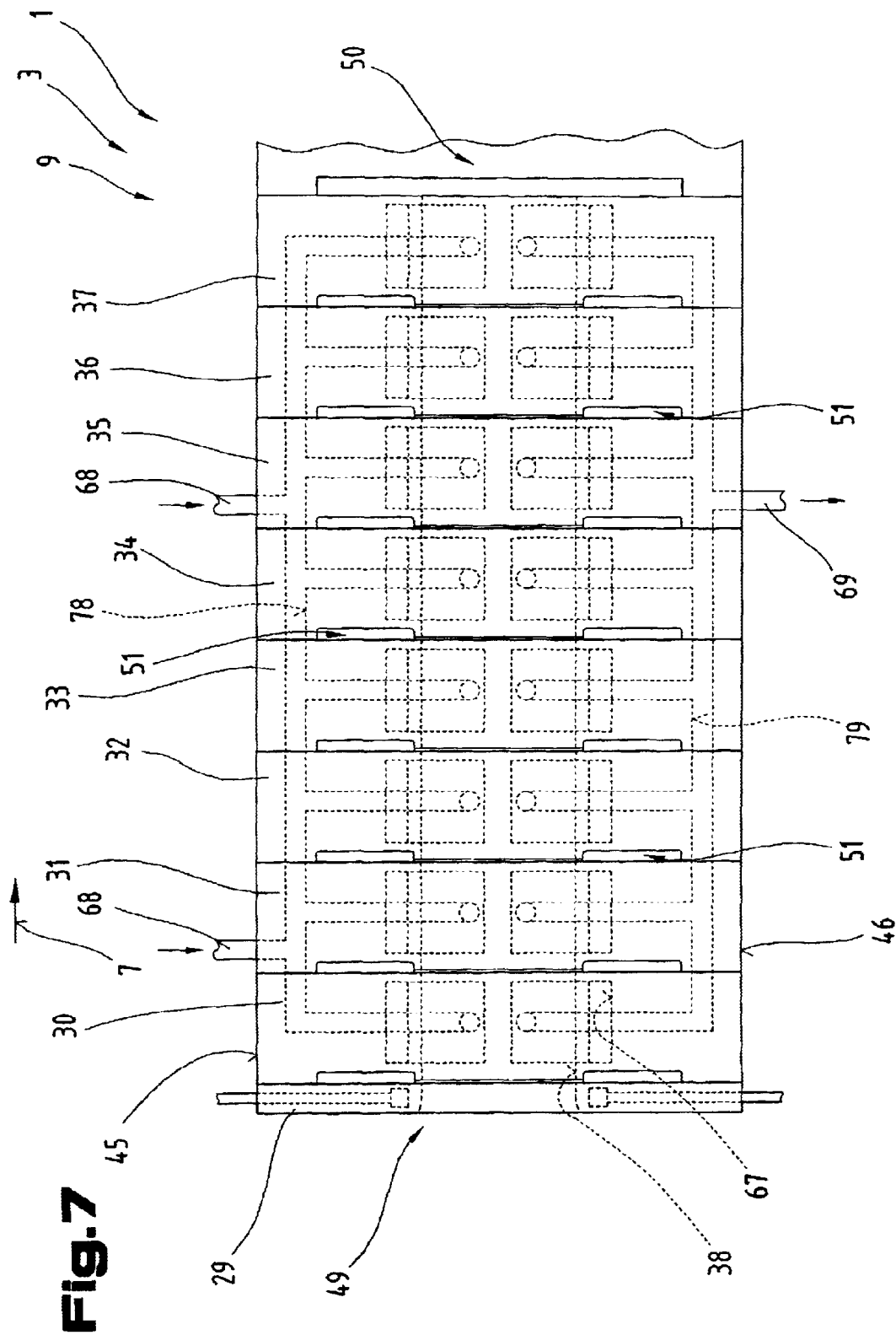
FIG. 7 is a simplified, schematic diagram illustrating another part-region of the shaping apparatus illustrated in FIG. 1, seen in a plan view with the cover plate raised.

FIG. 7 provides a simplified illustration of another design of the calibration units 29 to 37, which may also be construed as an independent embodiment, especially the layout of the circulation passage 67, in conjunction with separate inlet and outlet lines 68, 69, the reference numbers used in FIGS. 1 to 6 above again being used to denote the same parts. For the sake of clarity, the diagram does not show some of the connecting elements or optional centring means, the intention being to keep the drawings simple.

The individual calibration units 29 to 37 form a part of the calibration device 9 of the shaping apparatus 3 and are illustrated in a simplified format in a cover plate 54, which is raised.

The two inlet lines 68 open into a distribution passage 78, providing a flow connection to each of the circulation passages 67. Two inlet lines 68 are shown, provided in the calibration units 31 and 35. The distribution passage 78 in the embodiment illustrated as an example here runs between the calibration units 30 to 37, and, after circulating through the circulation passage 67, the cooling medium is delivered to a collection passage 79, also illustrated in a simplified format, where a flow connection is provided with the outlet line 69 in the region of the calibration unit 35. Naturally, it would also be possible to provide several inlet lines 68 and outlet lines 69 depending on cooling requirements and the amount of heat to be fed away to the distribution passage 78 and collection passage 79.

In the embodiment illustrated here, both the distribution passage 78 and the collection passage 79 extend through several calibration units 30 to 37 disposed one after the other, so that every one of the individual circulation passages 67 can be supplied with sufficient cooling medium. As may also be seen, both the distribution passage 78 and the collection passage 79 run externally to the cavity 51 provided between the individual calibration units 29 to 37. However, it would also be possible to provide a plurality of circulation passages 67, 76 and distribution passages 78 and collection passages 79 within the individual calibration units 29 to 37.

Figure 8:
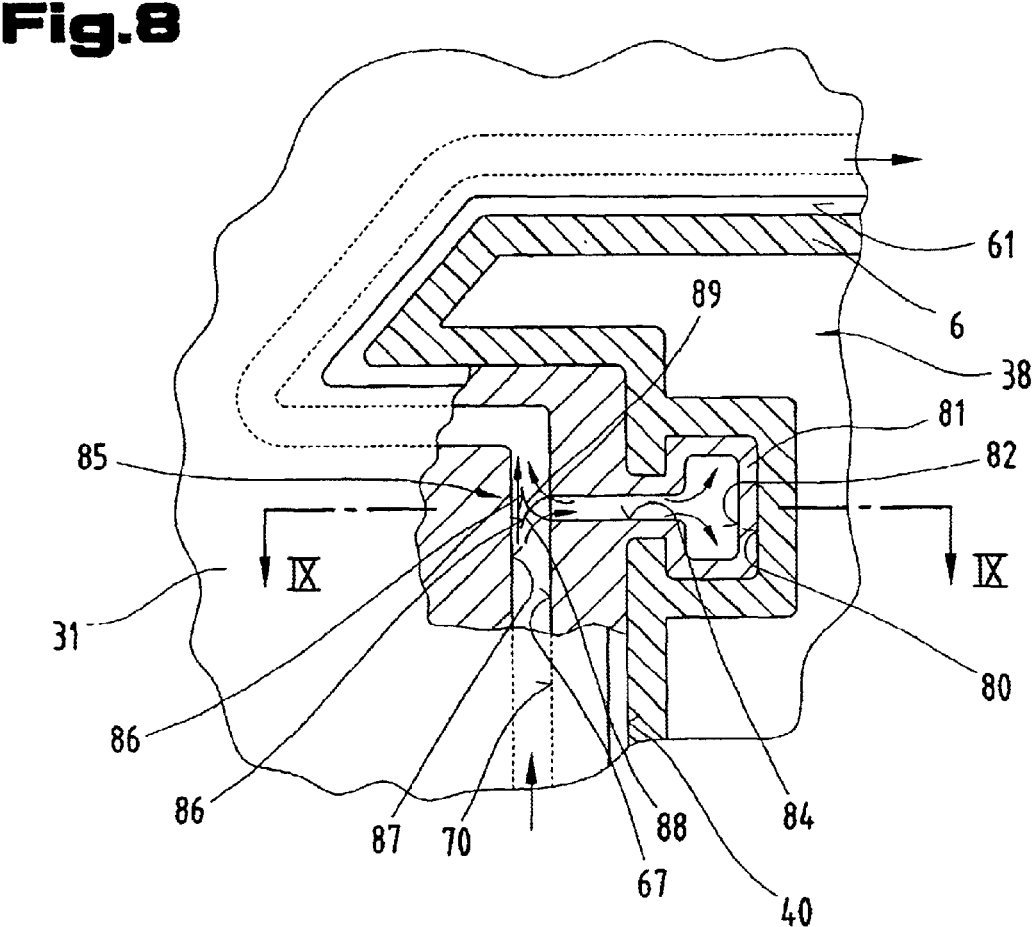
FIG. 8 illustrates a part-region of a calibrating unit provided with a transverse passage in addition to the circulation passage and a baffle system disposed in the circulation passage, viewed in partial section.
Figure 9:
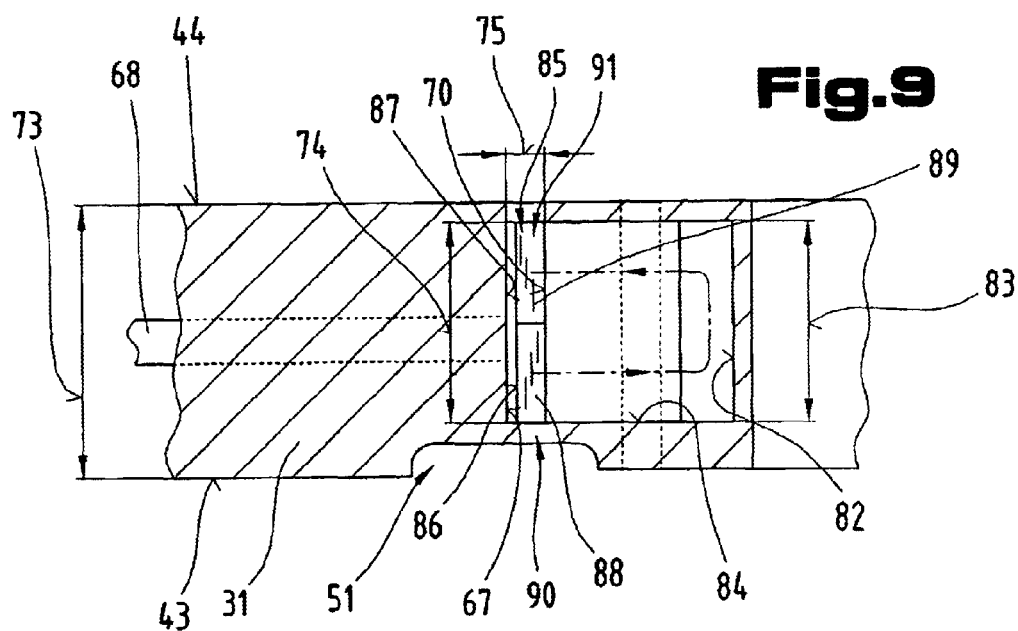
FIG. 9 is a plan view of the calibration unit illustrated in FIG. 8, in section along the line IX—IX of FIG. 8.

FIGS. 8 and 9 illustrate another design of the circulation passage 67, which may also be construed as an independent embodiment, and show a section of a calibration unit 31 on an enlarged scale, the reference numbers used for the description of FIGS. 1 to 7 again being used for the same parts. To avoid unnecessary repetition, reference may be made to the description of the previous drawings for details of the design and layout of the circulation passage 67, its inlet and outlet lines 68, 69 and the layout and design of the calibration orifice 38.

A simplified illustration of the article 6 is also shown, a recessed groove-shaped mounting channel 80 being provided in the article 6 in the region of the shaping surface 40 of the calibration orifice 38, which is calibrated and cooled by means of a calibration shoulder 81, in this case mushroom-shaped, projecting beyond the shaping surface 40. This calibration shoulder 81 extends into the calibration orifice 38, its purpose being to impart shape to and determine the final design of the mounting channel 80 within the article 6. Sealing elements may subsequently be provided in this mounting channel 80, for example, and may also be provided at various other points of the article 6. For the sake of simplicity, the calibration shoulder 81 and the mounting channel 80 shaped by it are shown on an enlarged and exaggerated scale.

Provided inside the calibration shoulder 81 is a transverse passage 82, extending across a predominant distance 83 between the spaced apart end faces 43, 44 corresponding to the thickness 73 of the calibration unit 31 in the same direction. The distance 83 of the transverse passage 82 may correspond to the distance 72 or passage dimension 74 of the circulation passage 67. However, it would also be possible to select the distance 83 so that it is different from the distance 72 or passage dimension 74.

As schematically indicated by an arrow in the region of the circulation passage 67, the cooling medium contained therein flows within the immediately adjacent shaping surfaces 39 to 42 thereof (see FIG. 5) along the calibration orifice 38, a connecting passage 84 being provided inside the calibration unit 33 in the region of the transverse passage 82, between the latter and the circulation passage 67, and is provided more or less in the distance 72 or 83 between the spaced apart end faces 43, 44. Like the circulation passage 67 and transverse passage 82, this connecting passage 84 is closed in the region of the two end faces 43, 44, which prevents the coolant from leaking in the region of the end faces 43, 44.

To ensure that the coolant is delivered efficiently from the circulation passage 67 via the connecting passage 84 and through to the transverse passage 82, a schematically indicated baffle system 85 is provided, and projects out starting from the connecting passage 84 and a delimiting surface 70 of the circulation passage 67 immediately adjacent to the shaping surface 40. As may be seen by comparing FIGS. 8 and 9, the circulation passage 67 has a passage dimension 75, parallel with the end faces 43, 44 or perpendicular to the shaping surface 40, and the baffle system 85 projects into the flow cross section of the circulation passage 67 in the direction remote from the calibration orifice 38 and transverse passage 82, at least in certain regions. An end 86 of the baffle system 85 projecting into the circulation passage 67 is spaced at a distance from a passage wall 87 lying opposite the delimiting surface 70 in this embodiment.

As may best be seen from FIG. 8, this distance enables a part-flow of the coolant to flow unhindered between the passage wall 87 and the end 86 of the baffle system 85, so that a main flow of coolant can be fed through the circulation passage 67. The baffle system 85 in this embodiment extends across the entire depth of the passage dimension 74 of the circulation passage 67 in the direction of the thickness 73 of the calibration unit 31. Accordingly, a first part 88 of the baffle system 85 is arranged upstream of another or second part 89 of the baffle system in the extrusion direction 7, the first part 88 of the baffle system 85 serving as an inlet system 90 from the circulation passage 67 into the transverse passage 82 and the other part 89 of the baffle system 85 serving as an outlet system 91 from the transverse passage 82 to the circulation passage 67. Naturally, the inlet system 90 and the outlet system 91 could also be provided in the circulation passage 67 reversed in the extrusion direction 7, in which case the flow direction of the transverse passage 82 would be reversed.

It is of advantage if the first and second part 88, 89 making up the baffle system 85, in particular the inlet system 90 and the outlet system 91, are provided in the form of baffle elements running towards one another in a plane parallel with the end faces 43, 44. Accordingly, these baffle elements running towards one another in the plane parallel with the end faces 43, 44 may be curved, in particular arcuate. Irrespective of the above, the inlet system 90 and the outlet system 91 or the two constituent parts 88, 89 could be designed as planar components, and would also project towards one another starting from the connecting passage 84 in the direction of the oppositely lying passage wall 87.

A more uniform and better directed flow, without excessive swirling or turbulence within the flow, can be obtained if the individual parts 88, 89 of the baffle system 85 are curved, thereby producing a part-flow leaving the circulation passage 67, which is forwarded via the connecting passage 84 into the transverse passage 82, where it is fed on in the extrusion direction 7 to the other end face 44 and then, again via the connecting passage 84, on to the other part 89 of the baffle system 85 and, due to the reciprocal curvature, delivered back to the main flow of coolant inside the circulation passage 67.

The choice of spacing or distance between the end 86 of the baffle system 85 and the passage wall 87 lying opposite the connecting passage 84 enables anything from a part-flow through to a full diversion of the main flow into the transverse passage 82 to be obtained.

Figure 10:
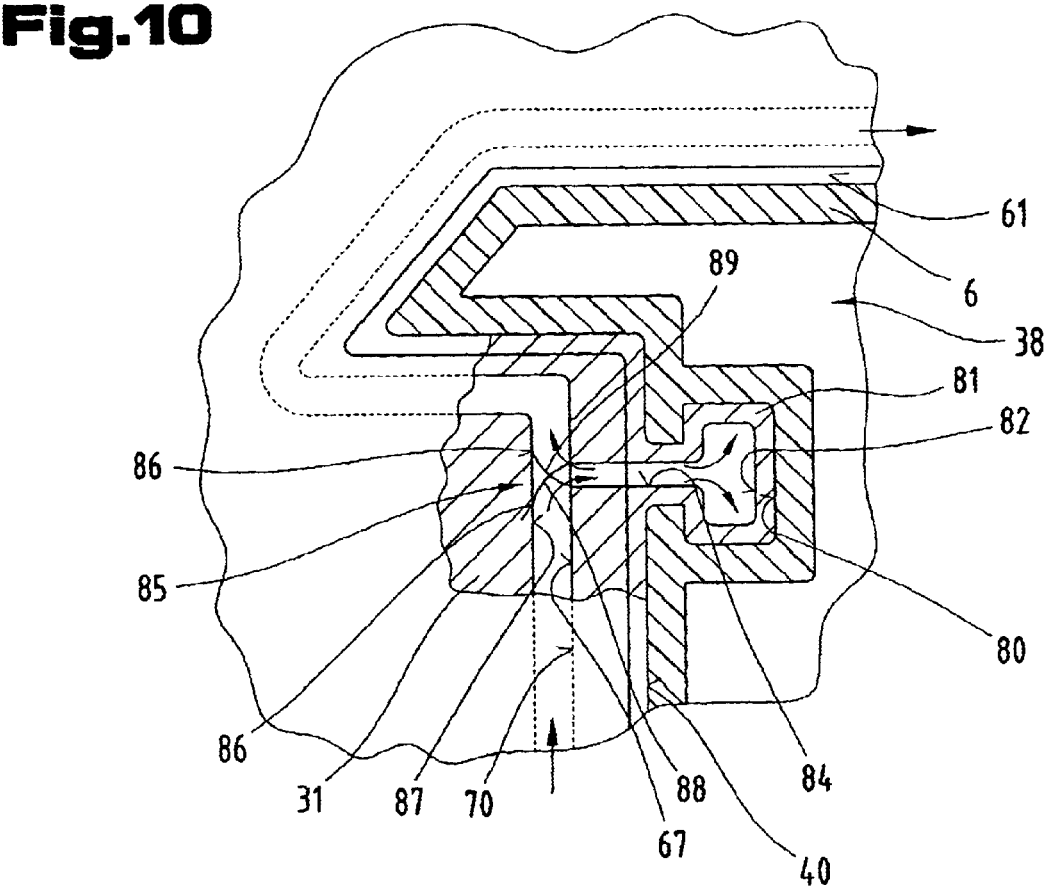
FIG. 10 is a view of another embodiment of a baffle system disposed in the circulation passage, seen in partial section.

FIG. 10 illustrates another design of the baffle system 85, which may also be construed as an independent embodiment, starting from the connecting passage 84 running in the direction of the oppositely lying passage wall 87, the same parts being shown by the same reference numbers as those used above for FIGS. 8 and 9. By contrast with the diagram shown in FIGS. 8 and 9, the baffle system 85 starts at the connecting passage 84 or the delimiting surface 70 of the circulation passage 67 immediately adjacent to the shaping surface 40 and runs right up to the oppositely lying passage wall 87, so that in the region of both parts 88, 89 the entire coolant flow is diverted from the circulation passage 67 in the region of the two parts 88, 89 through the connecting passage 84 and into the transverse passage 82.

If the two parts 88, 89 extend across the entire passage dimension 74 in the direction between the two end faces 43, 44, the entire coolant flow is diverted from the circulation passage 67 into the transverse passage 82 and back via the connecting passage 84 into the circulation passage 67. This will be the case if the two parts 88, 89 extend in full in the direction of the thickness 73 through the length and depth of the passage dimension 74, as also illustrated in FIG. 9. In order to provide a uniform flow behaviour, it is of advantage if each of the two parts 88, 89 occupies half the passage dimension 74 in the direction of the thickness 73 of the calibration unit 31.

Figure 11:
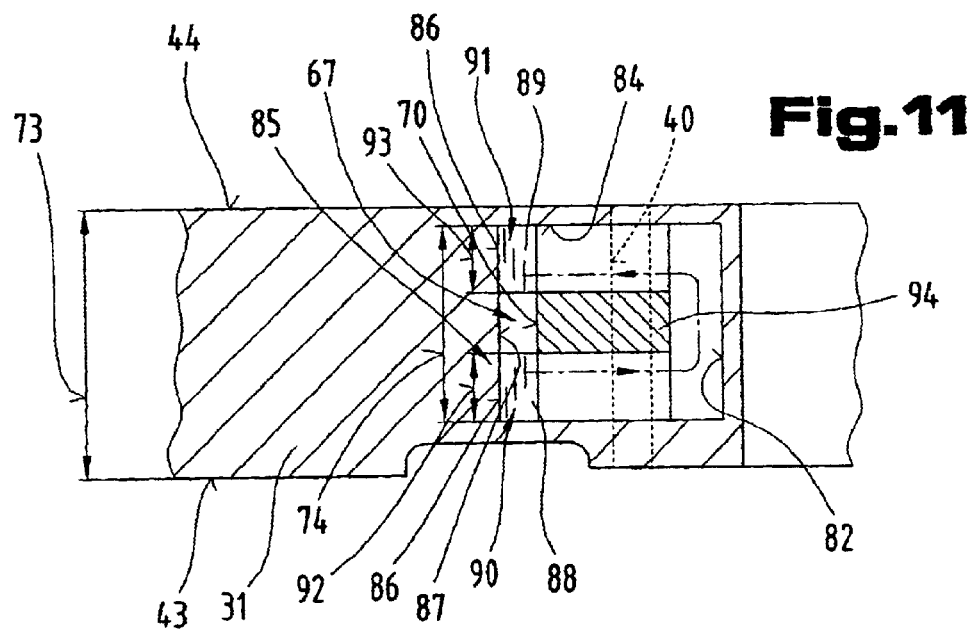
FIG. 11 is a plan view of another embodiment of a baffle system disposed in the circulation passage, seen in partial section

FIG. 11 illustrates another and optionally independent embodiment of the baffle system 85 having the two parts 88, 89 in the region of the circulation passage 67, the two parts 88, 89 in this case extending from the connecting passage 84 or the delimiting surface 70 up to the passage wall 87 lying opposite it. As illustrated, the two parts 88, 89 are of a respective length 92, 93 in the direction of the thickness 73 of the calibration unit 31 corresponding, in this embodiment, to approximately one third of the entire passage dimension 74 in the direction of the thickness 73. It would also be possible to select the length 92, 93 in a different ratio relative to the passage dimension 74, this value being greater and/or smaller than one third. Accordingly, the sum of the lengths 92 and 93 of the inlet system 90 and outlet system 91 in the direction of the thickness 73 of the calibration unit 31 is shorter than the full depth of the passage dimension 74 of the circulation passage 67 in the same direction.

In the embodiment illustrated as an example here, approximately one third of the cross-sectional dimension of the circulation passage 67 is maintained to allow the main flow to be fed unhindered inside the circulation passage 67 between the two parts 88, 89 spaced apart from one another, whilst the remaining flow of coolant in the region of the first part 88, forming the inlet system 90 is delivered into the connecting passage 84 and, adjoining it in the region of the circulation passage 67, flows through the latter in the direction of the thickness 73 of the calibration unit 31 and is then returned to the circulation passage 67 via the connecting passage 84 and the other part 89 forming the outlet system 91. As also illustrated, a dividing land 94 may be provided inside the connecting passage 84, which splits the coolant flow leaving the circulation passage 67 in the region of the connecting passage 84, producing a directed transverse and longitudinal flow inside the transverse passage 82 between the two end faces 43, 44 spaced apart from one another.

Irrespective of the above, however, the two parts 88, 89 could respectively be provided with their lengths 92, 93 but, perpendicular thereto, in other words from the delimiting surface 70 or the connecting passage 84, only along a part or certain regions to the passage wall 87, which will provide a flow cross section for the coolant to flow through the circulation passage 67 in between this passage wall 87 and the end 86 of the two parts 88, 89. Reference should be made to the diagram of FIG. 9 for details of this arrangement. Naturally, all the various designs of the baffle system 85 described above, in particular the choice of lengths 92, 93 and the degree to which the ends 86 extend from the delimiting surface 70 to the passage wall 87, may be freely combined with one another to suit requirements, it being possible to divert the flow by anything ranging from a minimum part-flow right through to a complete diversion of the main flow leaving the circulation passage 67, 76.

The vacuum pressures generated in the individual cavities 51 in all the embodiments described above may be selected so as to be the same or different and are preferably between −0.3 bar and −0.7 bar below atmospheric pressure. It is also of advantage if the calibration units 29 to 37 are between 6.0 mm and 60.0 mm thick, preferably between 15.0 and 40.0 mm thick, in the direction perpendicular to the end faces 43, 44.

Finally, for the sake of good order, it should be pointed out that in order to provide a clearer understanding of the structure of the shaping apparatus, it and its respective parts are illustrated to a certain degree out of scale and/or on an enlarged and/or reduced scale.

The independent solutions proposed by the invention and the underlying task may be found in the description.

Above all, the individual embodiments illustrated in FIGS. 1; 2, 3, 4; 5, 6; 7; 8, 9; 10 and 11 may be construed as independent solutions to the subject matter proposed by the invention. The relevant tasks and the solutions proposed by the invention may be taken from the detailed descriptions of these drawings.

| List of reference numbers | |
|---|---|
| 1 | Extrusion system |
| 2 | Extruder |
| 3 | Shaping apparatus |
| 4 | Cooling system |
| 5 | Crawler off-take |
| 6 | Article |
| 7 | Extrusion direction |
| 8 | Extrusion die |
| 9 | Calibrating device |
| 10 | Support plate |
| 11 | Container |
| 12 | Material |
| 13 | Conveyor screw |
| 14 | Plasticizing unit |
| 15 | Heating device |
| 16 | Transition zone |
| 17 | Machine bed |
| 18 | Standing surface |
| 19 | Calibrating table |
| 20 | Roller |
| 21 | Roller |
| 22 | Track |
| 23 | Calibration die |
| 24 | Calibration die |
| 25 | Calibration die |
| 26 | Calibration die |
| 27 | Mounting plate |
| 28 | Cooling chamber |
| 29 | Calibration unit |
| 30 | Calibration unit |
| 31 | Calibration unit |
| 32 | Calibration unit |
| 33 | Calibration unit |
| 34 | Calibration unit |
| 35 | Calibration unit |
| 36 | Calibration unit |

| -continued | |
|---|---|
| List of reference numbers | |
| 37 | Calibration unit |
| 38 | Calibration orifice |
| 39 | Shaping surface |
| 40 | Shaping surface |
| 41 | Shaping surface |
| 42 | Shaping surface |
| 43 | End face |
| 44 | End face |
| 45 | Side face |
| 46 | Side face |
| 47 | Side face |
| 48 | Side face |
| 49 | Inlet region |
| 50 | Outlet region |
| 51 | Cavity |
| 52 | Passage |
| 53 | Passage |
| 54 | Cover plate |
| 55 | Base plate |
| 56 | Suction line |
| 57 | Width |
| 58 | Width |
| 59 | Width |
| 60 | Distance |
| 61 | Part-end surface |
| 62 | Part-end surface |
| 63 | Distance |
| 64 | Part-end surface |
| 65 | Radius |
| 66 | Component |
| 67 | Circulation passage |
| 68 | Inlet line |
| 69 | Outlet line |
| 70 | Delimiting surface |
| 71 | Distance |
| 72 | Distance |
| 73 | Thickness |
| 74 | Passage dimension |
| 75 | Passage dimension |
| 76 | Circulation passage |
| 77 | Connecting line |
| 78 | Distribution passage |
| 79 | Collection passage |
| 80 | Mounting channel |
| 81 | Calibration shoulder |
| 82 | Transverse passage |
| 83 | Distance |
| 84 | Connecting passage |
| 85 | Baffle system |
| 86 | End |
| 87 | Passage wall |
| 88 | Part |
| 89 | Part |
| 90 | Inlet system |
| 91 | Outlet system |
| 92 | Length |
| 93 | Length |
| 94 | Dividing land |

What is claimed is:

1. A shaping apparatus for an extrusion system with at least one calibration device comprising
    (a) at least one calibration die with several calibration units disposed one after another in an extrusion direction, each calibration unit having
        (1) at least one calibration orifice with several shaping surfaces which come into contact with an article fed therethrough,
        (2) end faces spaced apart from each other in the extrusion direction, and
        (3) side faces extending between the end faces, a first end face being directed towards an inlet region and a second end face being directed towards an outlet region of the article fed through the calibration orifice, (b) at least one cavity formed between two immediately adjacent calibration units, the cavity extending from a respective one of the shaping surfaces to, and opening into, a passage, (c) means for dispersing heat, and (d) wherein the calibration orifice is provided with
  (1) at least one continuous circulation passage around a predominant part of, and immediately adjacent to, the circumference thereof, the circulation passage having a separate inlet and outline line, extending across a predominant distance of a thickness between the two end faces of the calibration unit and being closed in the region of the end faces, the circulation passage is provided with at least one transverse passage along the circumferential extension thereof extending across a predominant distance of the thickness between the end faces, the transverse passage being closed at the region of the two end faces and having a flow connection to the circulation passage via at least one connecting passage, and (e) a baffle system projecting from the connecting passage in a direction opposite the calibration orifice, at least in certain regions, into the flow cross-section of the circulation passage.

2. The shaping apparatus of claim 1, wherein the end faces run parallel to each other.

3. The shaping apparatus of claim 1, wherein the baffle system projects from the connecting passage in the direction opposite the calibration orifice as far as a passage wall of the circulation passage lying opposite the connecting passage.

4. The shaping apparatus of claim 1, wherein the baffle system extends in certain regions across a depth of the passage dimension of the circulation passage in the direction of the thickness of the calibration unit.

5. The shaping apparatus of claim 1, wherein the baffle system extends across the full depth of the passage dimension of the circulation passage in the direction of the thickness of the calibration unit.

6. The shaping apparatus of claim 1, wherein a first part of the baffle system is designed as an inlet system from the circulation passage into the transverse passage and second part of the baffle system as an outlet system from the transverse passage to the circulation passage.

7. The shaping apparatus of claim 6, wherein a length of the inlet system plus a length of the outlet system in the direction of the thickness of the calibration unit is shorter than the entire depth of the passage dimension of the circulation passage in the same direction.

8. The shaping apparatus of claim 6, wherein the length of the inlet system plus the length of the outlet system in the direction of the thickness of the calibration unit is the same as the full depth of the passage dimension of the circulation passage in the same direction.

9. The shaping apparatus of claim 6, wherein the inlet system and the outlet system are disposed in the circulation passage respectively adjacent to one of the two end faces.

10. The shaping apparatus of claim 6, wherein the first and the second part of the baffle system forming the inlet system and the outlet system are formed by baffle elements extending towards one another in a plane parallel with the end faces.

11. The shaping apparatus of claim 10, wherein the baffle elements have a curved shape in the plane parallel with the end faces.

12. The shaping apparatus of claim 1, wherein several calibration units each have at least one circulation passage.

13. The shaping apparatus of claim 1, wherein the calibration orifice in each calibration unit has several circulation passages separated from one another, each having separate inlet and outlet lines.

14. The shaping apparatus of claim 13, wherein the calibration orifice in each calibration unit has two circulation passages separated from one another, each having separate inlet and outlet lines.

15. The shaping apparatus of claim 1, wherein the circulation passage has substantially the same flow cross section along its circumferential extension around the calibration orifice.

16. The shaping apparatus of claim 1, wherein a delimiting surface of the circulation passage facing the calibration orifice runs at substantially the same distance from an associated shaping surface of the calibration orifice.

17. The shaping apparatus of claim 1, wherein the outlet line from a first calibration unit is connected to the inlet line of the immediately adjacent calibration unit.

18. The shaping apparatus of claim 1, wherein a connection between the outlet line and the inlet line of immediately adjacent calibration units is disposed externally to the cavity between the calibration units.

19. The shaping apparatus of claim 1, wherein the inlet line is connected to the circulation passages by means of a common distribution passage.

20. The shaping apparatus of claim 19, wherein the distribution passage extends continuously through several calibration units.

21. The shaping apparatus of claim 19, wherein the distribution passage is disposed externally to the cavity between the individual calibration units.

22. The shaping apparatus of claim 1, wherein several circulation passages are connected to the outlet line via a common collection passage.

23. The shaping apparatus of claim 22, wherein the collection passage extends continuously through several calibration units.

24. The shaping apparatus of claim 22, wherein the collection passage is disposed externally to the cavity provided between the individual calibration units.

25. The shaping apparatus of claim 1, wherein the cavity disposed between the calibration units runs continuously around the entire circumference of the calibration orifice.

26. The shaping apparatus of claim 1, wherein the cavity has a differing width starting from the shaping surfaces in the direction parallel with the shaping surfaces.

27. The shaping apparatus of claim 1, wherein the width of the cavity increases, the greater the distance from the shaping surface is.

28. The shaping apparatus of claim 27, wherein the cavity between the facing end faces of immediately adjacent calibration units has a width of between 0.2 mm and 3.0 mm across a first distance of 0.3 mm to 5.0 mm starting from the shaping surface in a direction perpendicular thereto, and first partial end faces are formed on the calibration unit.

29. The shaping apparatus of claim 28, wherein the first distance is 0.5 mm to 2.0 mm.

30. The shaping apparatus of claim 28, wherein the cavity has a width of between 0.4 mm and 1.0 mm across the first distance.

31. The shaping apparatus of claim 28, wherein the cavity has a width of between 2.5 mm and 10.0 mm adjoining the first distance, and second partial end faces are formed on the calibration unit.

32. The shaping apparatus of claim 28, wherein, adjoining the first distance, the cavity has a width of between 1.0 mm and 2.5 mm over another distance of between 6.0 mm and 20.0 mm, starting from the first distance in a direction perpendicular to the shaping surface, and additional partial end faces are formed on the calibration unit.

33. The shaping apparatus of claim 28, wherein the width of the cavity differs around the circumference of the calibration orifice in the region of the first partial end face.

34. The shaping apparatus of claim 28, wherein a radius in a transition region between the shaping surfaces and the immediately adjacent first partial end faces of the calibration units is between 0.1 mm and 1.0 mm.

35. The shaping apparatus of claim 1, wherein the cavity is bounded by strip-shaped structural components on sides facing away from the calibration orifice in the region of oppositely lying first side faces of the calibration unit.

36. The shaping apparatus of claim 35, wherein the cavity opens into at least one passage in the region of additional side faces of the calibration unit.

37. The shaping apparatus of claim 1, wherein partial end faces on the calibration units are directed towards the inlet region of the article fed through the calibration device.

38. The shaping apparatus of claim 1, wherein the calibration unit is between 6.0 mm and 60.0 mm thick in the direction perpendicular to the end faces.

39. The shaping apparatus of claim 38, wherein the calibration unit is between 15.0 mm and 40.0 mm thick in the direction perpendicular to the end faces.

* * * * *